Oct. 16, 1951     J. JONES     2,571,249
AXIALLY SHIFTING TYPE MULTIPLE CYLINDER
OPERATED TIRE REMOVING MACHINE
Filed July 26, 1946     3 Sheets-Sheet 2
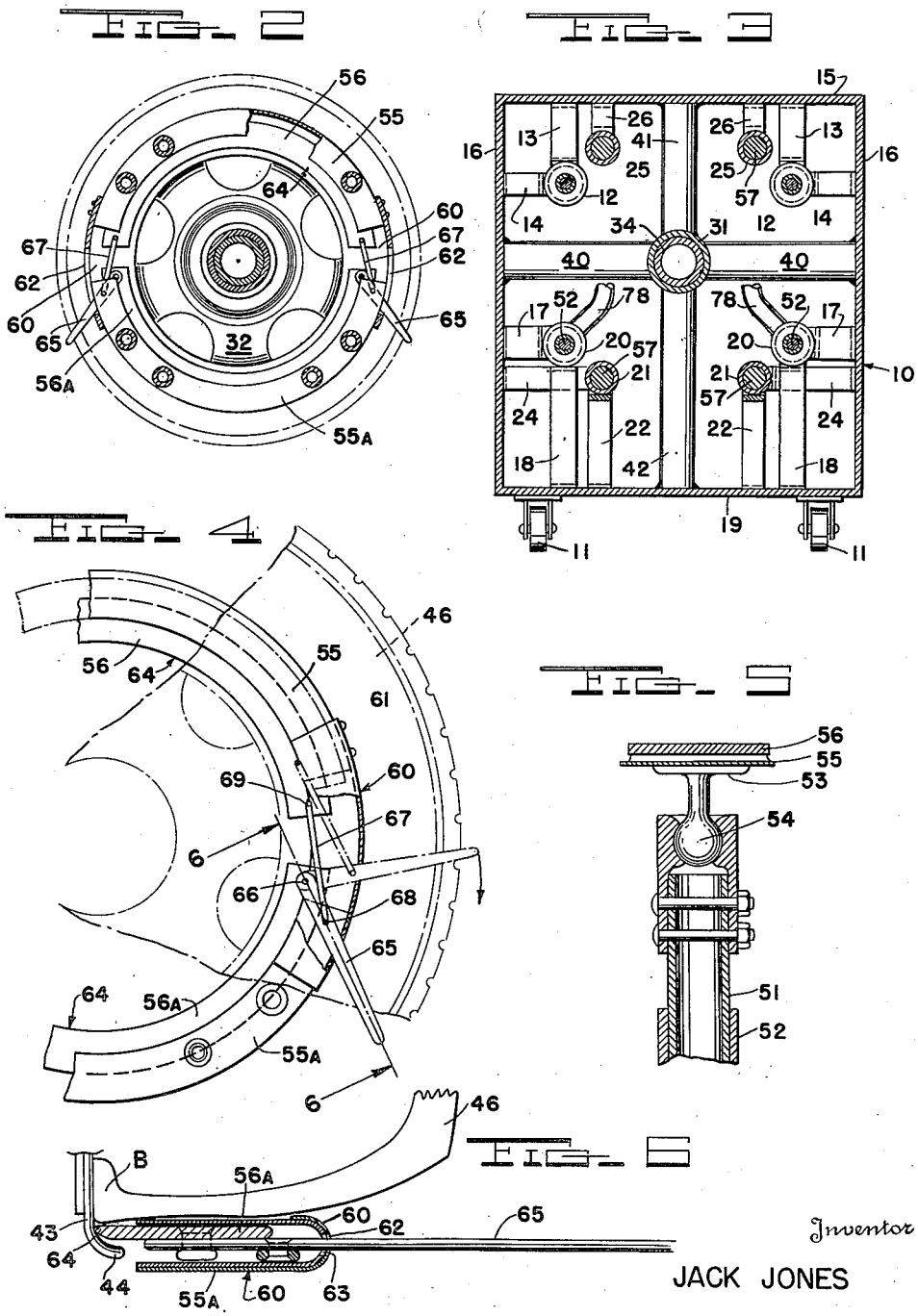
Inventor
JACK JONES

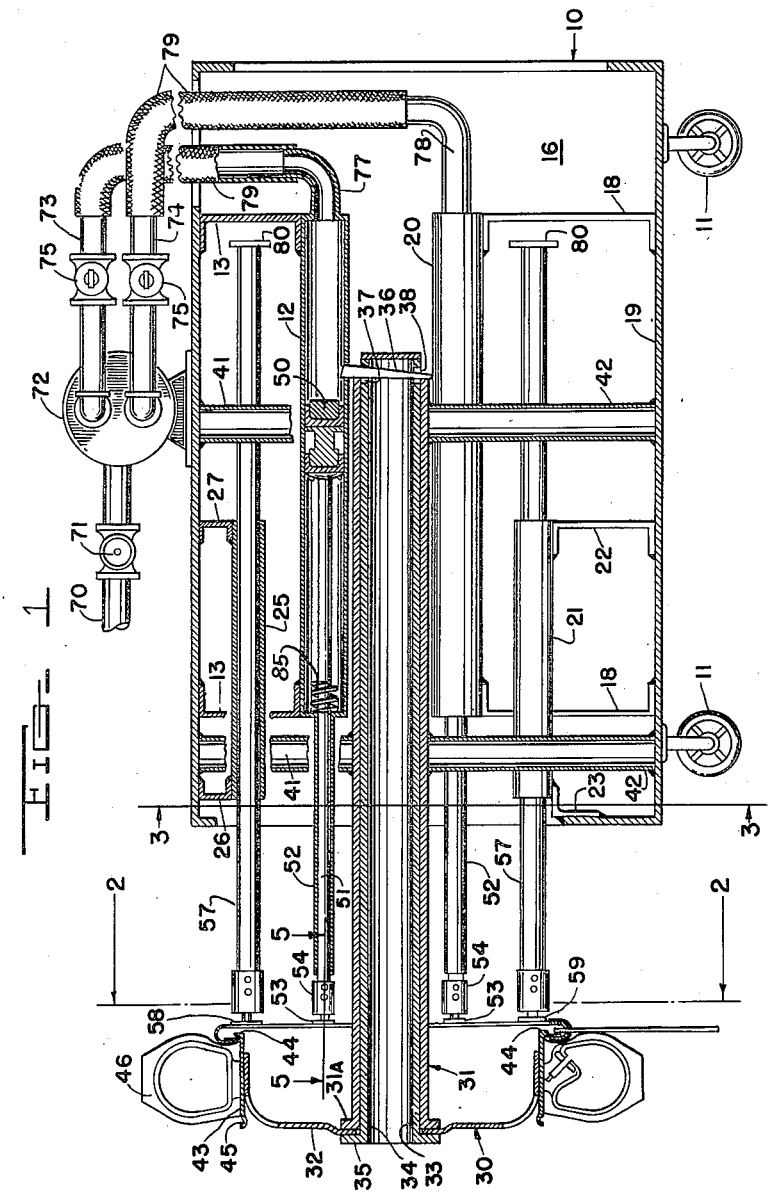

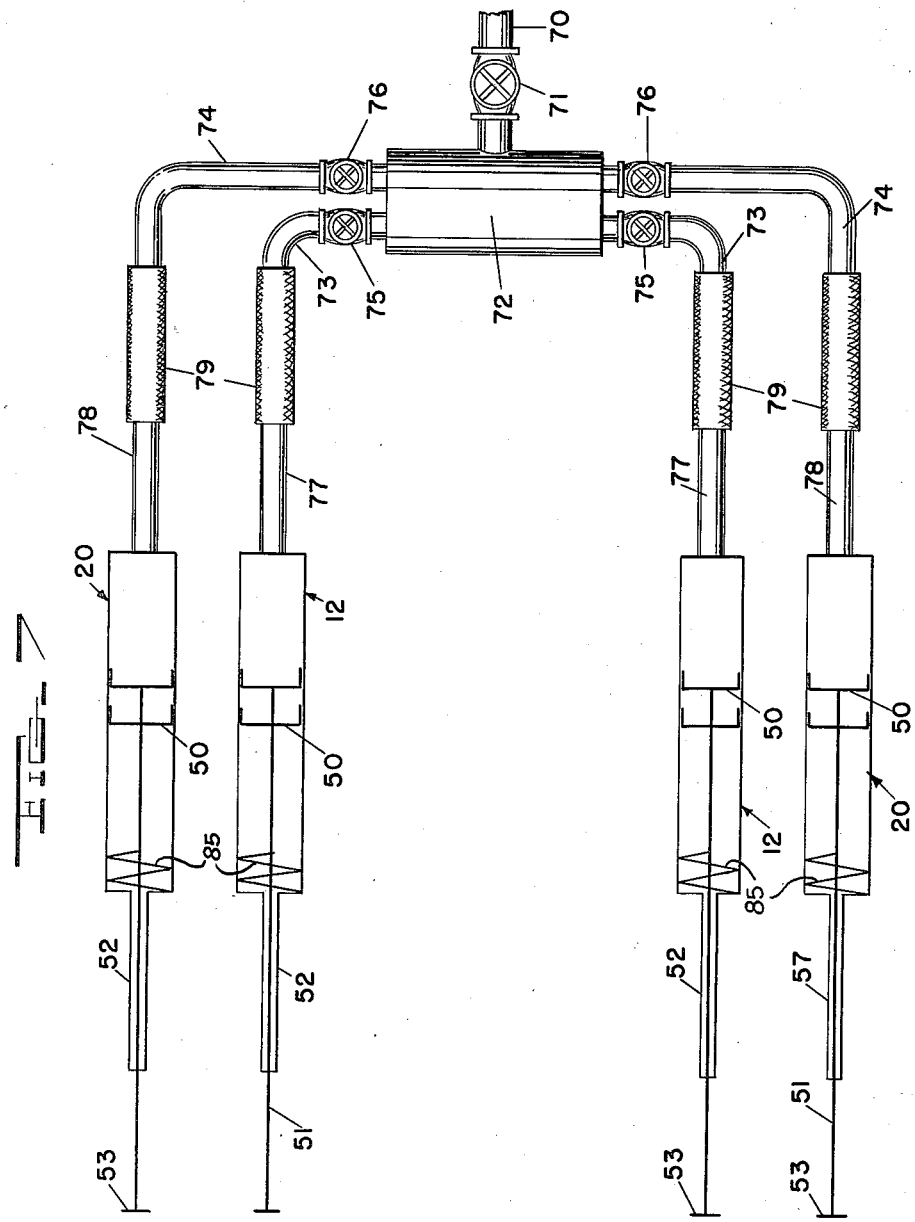

Patented Oct. 16, 1951

2,571,249

UNITED STATES PATENT OFFICE 2,571,249

AXIALLY SHIFTING TYPE MULTIPLE CYLINDER OPERATED TIRE REMOVING MACHINE

Jack Jones, Eden, Tex.

Application July 26, 1946, Serial No. 686,539

6 Claims. (Cl. 157—1.2)

This invention relates to tire removers.

An object of the invention is the provision of an apparatus for removing from vehicle wheels tires of the cumbersome type, said apparatus including a device acting on the side of a tire for forcing the tire from a rim, with means for supporting said device in substantially a vertical plane, pressure being applied simultaneously at a number of points or selectively at one or any number of points.

Another object of the invention is the provision of an apparatus for removing tires of the cumbersome type from vehicle wheels in which the rim of the wheel is centered on the apparatus with pressure being applied selectively at a plurality of spaced points around one side wall of a tire for forcing said tire from the rim, the pressure being exerted upon a curved means which is in contact with the tire.

A further object of the invention is the provision of an apparatus for removing a tire of the cumbersome type from a vehicle wheel in which a split clamping ring is employed initially for moving the inner periphery of one face of the tire away from the usual annular flange on one peripheral edge of the rim, with pressure being applied to the ring simultaneously at a plurality of points or selectively at one or more points of particular resistance for forcing the tire from the rim.

A still further object of the invention is the provision of an apparatus for removing a tire from the wheel of a truck, in which a split clamping ring is employed initially for forcing the inner periphery of one face of the tire away from the usual annular flange on one peripheral edge of the rim, a holder embracing the ring with means for supporting and centering the ring relative to the tire, force being applied selectively by means of air pressure at one or more points or simultaneously at a plurality of points for removing the tire from the rim.

The invention consists in the novel construction, arrangement and combinations of parts hereinafter more particularly described and claimed.

Three sheets of drawings accompany this specification as part thereof, in which like reference characters indicate like parts throughout.

In the drawings:

Figure 1 is a longitudinal vertical section of the apparatus showing various operating parts;

Figure 2 is a transverse vertical section taken along the line 2—2 of Figure 1;

Figure 3 is a transverse vertical section taken along the line 3—3 of Figure 1;

Figure 4 is an enlarged fragmentary vertical section showing a clamping element and operating means therefor associated with the tire removing apparatus;

Figure 5 is a horizontal section taken along the line 5—5 of Figure 1;

Figure 6 is a transverse section taken along the line 6—6 of Figure 4; and

Figure 7 shows more or less diagrammatically a plurality of pistons and cylinders for exerting pressure on a tire removing device with means for selectively controlling the air pressure to the various cylinders.

Referring more particularly to the drawings, 10 designates a housing for the tire removing apparatus. A sufficient number of wheels 11 support the housing so that the apparatus may be moved to a convenient place for acting on a tire.

The tire removing apparatus includes a number of cylinders 12 supported by brackets 13 and 14 connected respectively to the top 15 and side walls 16 of the housing 10. Brackets 17 and 18 connected respectively with the side walls 16 and the bottom 19 of the housing support other cylinders 20.

Sleeve guides 21 are located in the lower portion of the housing and each sleeve is carried by brackets 22, 23 and 24. Upper guides 25 are carried by brackets 26 and 27 attached to the top 15 of said housing.

A centering device for a wheel 30 includes a sleeve 31 supported in the housing 10 with a flanged end 31ª projecting through an opening in one end of the housing and engaging one face of a disk 32 of the wheel. The disk has a central opening 33 which receives a telescoping tube 34. Since the internal diameter of the sleeve 31, the external diameter of the tube 34 and the diameter of the opening 33 are substantially the same, the tube will aid in supporting the wheel 30.

The outer end of the tube has a flange 35 abutting the outer face of the disk 32 so that when a wedge 36 is forced through openings 37 and 38 in the inner end of the tube 34 with one edge of the wedge in contact with the inner end of the sleeve 31, the wheel will be held firmly in place on the housing 10.

Any suitable means may be employed for supporting the sleeve 31 in position within the housing. For the purpose of illustrating one form, braces 40, 41 and 42 are shown connected between the sleeve 31 on the one hand, and the walls of said housing on the other.

The disk 32 of the wheel has the usual rim 43 provided with an annular rib or flange 44 along one peripheral edge. The opposite edge of said rim has an annular groove 45 to receive a ring (not shown) which cooperates with the rib 44 to maintain the inflated tire 46 in position. The ring, generally employed on rims supporting truck tires, is removed before pressure is applied for forcing a tire from the rim.

A piston 50 is slidably mounted in each of the cylinders 12 and 20 and operates a rod 51 mounted in a guide 52 connected to each cylinder. A shoe 53 has a universal connection at 54 with a respective rod 51. The shoes are attached in pairs to respective semi-annular sections 55 and 55a of a holder for corresponding semi-annular sections 56 and 56a which form a bead loosening device as shown in Figures 1 and 2.

A rod 57 is slidably mounted in each of the sleeves 21 and 25. One of the rods is slidably mounted in each of the upper sleeves 25 and has a shoe 58 attached to the upper section 55 of the holder. Each lower sleeve 21 has a rod 57 slidably mounted therein with a shoe 59 connecting said rod with the lower section 55a of said holder.

Each section 55 and 55a of the holder is U-shaped in cross section (Figure 6). The adjacent ends of the sections are retained in operative relation by a connecting member 60 which is U-shaped in cross-section and which has one end secured at 61 to the section 55, while the other end slidably receives the adjacent end of the other section 55a. Each connecting member has a slot 62 aligning with a slot 63 in the section 55a of the holder for a purpose to be presently described.

The ends of the section 56 and 56a in the respective sections 55 and 55a of the holder are drawn together circumferentially by a toggle arrangement. A lever 65 has one end pivoted at 66 on an end of the section 56a. There is such a lever on each of said section. A link 67 has one end pivotally connected at 68 to the lever 65 adjacent the pivot 66, while the other end of said link has pivotal connection 69 with the adjacent end of the section 56. Said levers are operable in the aligned slots 62 and 63 for drawing the adjacent ends of the sections 56 and 56a towards each other and thus drawing said sections inwardly radially of the wheel. The inner peripheral edges 64 of said sections as shown in Figure 6 are slightly sheared off and rounded so that when said sections are drawn together said edges will be forced inwardly between the bead of the tire and flange of the rim, thus loosening the bead.

The pistons 50 in the cylinders 12 and 20 are operated by compressed air which is a normal complement of a gasoline station. A pipe 70 is adapted to be connected to the usual compressed air tank at the station. A valve 71 controls the flow of compressed air to the header 72, acting as a distributor for the air, to a plurality of pipes 73 and 74. Pipes 73 supply cylinders 12 with air, while pipes 74 supply air to the cylinders 20. Valves 75 control the flow of air from the tank or header 72 to the pipes 73. Valves 76 control the flow of air to the pipes 74.

Supply pipes 77 leading to the cylinders 12 and supply pipes 78 leading to the cylinders 20 have rubber hose connections 79 with the respective groups of pipes 73 and 74.

Each guide rod 57 has a flange 80 at its inner end to prevent said rods from becoming disengaged from the apparatus.

The operation of the apparatus is as follows:

The apparatus is designed particularly for removing tires from the wheels of trucks since the rims of such wheels have a split ring along one peripheral edge of the rim which must be released before the tire casing can be forced off the rim, as shown in Figure 1.

The central opening in the disk 32 of the wheel is so positioned that the supporting tube 34 when inserted through said central opening will be in axial alignment with the sleeve 31, so that said tube may be passed into the sleeve until the flange 35 on the tube will engage the outer face of the disk 32. This assembly is forced inwardly until the inner face of the disk 32 is in contact with the flange 31a on the sleeve 31. The wedge 36 is then driven through the passages 37 and 38, whereby the disk 32 carrying the tire 46 will be held rigidly in place and the tire is now ready to be forced from the rim 43.

The preliminary bead loosening device constituted by the sections 56 and 56a, together with the associated holder within which it is nested, is moved into operative relation with the inner side wall of the tire 46 so that the inner peripheral edges 64 of the sections 56 and 56a may be forced towards each other and between the rib 44 on the rim 43 and the bead B of the casing 46 for forcing said bead away from the said rim. In order to move the sections 56 and 56a towards each other, the levers 65 are rocked in the direction indicated by the arrow in Figure 4, so that said levers will assume the positions shown in Figure 2.

The valve 71 is opened and compressed air will fill the header 72. Then all of the valves 75 and 76 are opened so that the compressed air will act on the pistons 50 in the cylinders 12 and 20. The pistons will force the rods 51 and likewise the shoes 53 attached to the holder sections 55 and 55a independently towards the left in Figure 1. The holder sections, together with the sections 56 and 56a of the clamping device, will press against the tire and force said tire off the rim.

If for any reason it is found that a portion of the bead resists movement, then all but one of the valves 75 and 76 which is adjacent the point of resistance will be turned off or partially off so that the pressure may be applied at this particular point to release the bead. The valves may be selectively operated as required to force the bead away from points of resistance.

During the process of removal of the tire, the rods 57 sliding neatly in the sleeves 21 and 25 will aid in guiding the tire along a horizontal line which lies in the longitudinal axis of the sleeve 31. It is to be borne in mind that the sleeve 31 and tube 34 not only center the tire with respect to the holder sections 55 and 55a but support and hold the wheel in a fixed position against the pressure of the pistons when acted on by the compressed air.

Thus it will be seen that all pistons may be actuated simultaneously or they may be operated selectively or successively for progressively forcing the tire from a rim. During this operation, the rods 57 sliding in the guides maintain the pusher sections 55 and 55a in substantially a vertical position and thus prevent tilting or jamming of said sections and the tire with respect to the rim.

Various modifications in the structure of the various parts will readily suggest themselves to those skilled in the art but within the scope of the present invention as claimed.

Having thus described my invention, I claim:

1. An apparatus for removing tires from rims of vehicle wheels comprising a supporting frame, means associated with the frame for supporting a wheel rigidly on the frame, semicircular tire engaging members U-shaped in cross section adapted to contact one side wall of the tire of the wheel, means forcibly moving said tire engaging members against the tire to cause removal of the tire from the rim of the wheel, semicircular members nested within the tire engaging members and toggle means for drawing said members toward each other radially of the wheel for causing an initial release of a bead on the tire.

2. An apparatus for removing tires from rims of vehicle wheels comprising a supporting frame, means on the frame for retaining a wheel firmly on said frame, circumferentially spaced hollow tire-engaging members adapted to contact one side wall of the tire said hollow members being open radially inwardly, means radially contractible with respect to the wheel located in the hollow tire-engaging members, and mechanism for forcing said radially contractible means out of the hollow members and between the bead of the tire and the flange of the rim, a plurality of means connected with the tire-engaging members at spaced points and means for selective operation of the plurality of means for forcing the tire from the rim.

3. An apparatus for removing tires from rims of vehicle wheels comprising a supporting frame, means on the frame for retaining a wheel firmly on said frame, circumferentially spaced hollow semicircular tire-engaging members open radially inward adapted to contact one side wall of the tire, means located in the hollow tire-engaging members including circumferentially spaced arcuate secitons, a toggle lever pivoted at each end of one section and a link connecting each lever with an adjacent end of the other section, a plurality of reciprocating means connected with the tire-engaging members and independent operating means for the reciprocating means for forcing the tire-engaging members against the tire to remove said tire.

4. An apparatus for removing tires from rims of vehicle wheels comprising a supporting frame, means on the frame for retaining a wheel firmly on said frame, circumferentially spaced hollow tire-engaging members open radially inward adapted to contact one side wall of the tire, means radially operable in the hollow tire-engaging members for separating a bead on said side wall loose from the flange on the rim, slidably mounted means for supporting the tire-engaging members in a plane parallel to a plane passing through the wheel and at right angles to the axis of said wheel, and independent means acting on the tire-engaging members for causing said tire-engaging members to force the tire from the rim.

5. Apparatus for removing the tire from a vehicle wheel comprising a frame, a plurality of tubular guide members rigidly supported by the frame said tubular guide members arranged with their axes parallel, the axis of one centrally positioned with respect to the others and the latter circumferentially spaced and equi-distant from said central one, guide rods slidable in said tubular guides, opposing annular flanges on the outer adjacent ends of the central tubular guide and guide rod to engage the opposite sides around the central opening of a vehicle wheel therebetween to thereby center and clampingly support said wheel, means to hold said flanges in clamped position, arcuate tire-engaging members, each of said tire-engaging members supported by a plurality of guide rods whereby said tire-engaging members are maintained in planes substantially parallel with each other and perpendicular to the axis of the central guide rod, a plurality of pressure cylinders rigidly supported by the frame, parallel with the tubular guide members, and circumferentially spaced equi-distant from the central tubular guide, pistons and piston rods for said pressure cylinders, universal connections between the ends of the piston rods and the tire-engaging members, and means for independently and selectively supplying a fluid under pressure to said pressure cylinders.

6. The device of claim 5 in which the tire-engaging members are circumferentially spaced with means associating the adjacent ends of said members to permit endwise movement between said members while maintaining them in a substantially common plane.

JACK JONES.

REFERENCES CITED

The following references are of record in the file of this patent:

UNITED STATES PATENTS

| Number | Name | Date |
|---|---|---|
| 1,162,216 | Booth | Nov. 30, 1915 |
| 1,475,517 | Snider | Nov. 27, 1923 |
| 1,724,813 | Weaver et al. | Aug. 13, 1929 |
| 1,758,264 | Senger | May 13, 1930 |
| 1,780,972 | Neuberg | Nov. 11, 1930 |
| 1,959,655 | Brouhard | May 22, 1934 |
| 2,251,293 | Schwartz et al. | Aug. 5, 1941 |
| 2,416,195 | Mitchell | Feb. 18, 1947 |
| 2,423,652 | Kelley | July 8, 1947 |
| 2,449,289 | Garey | Sept. 14, 1948 |
| 2,473,571 | Cook | June 21, 1949 |

FOREIGN PATENTS

| Number | Country | Date |
|---|---|---|
| 720,878 | France | Dec. 12, 1931 |
| 612,890 | Germany | May 7, 1935 |